US011635031B2

United States Patent
Reuter et al.

(10) Patent No.: US 11,635,031 B2
(45) Date of Patent: Apr. 25, 2023

(54) SIMULTANEOUSLY PUMPING AND MEASURING DENSITY OF AIRCRAFT FUEL

(71) Applicant: Hamilton Sundstrand Corporation, Charlotte, NC (US)

(72) Inventors: Charles E. Reuter, Granby, CT (US); Gerald P. Dyer, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 614 days.

(21) Appl. No.: 16/678,905

(22) Filed: Nov. 8, 2019

(65) Prior Publication Data
US 2021/0139159 A1   May 13, 2021

(51) Int. Cl.
| | | |
|---|---|---|
| F02C 9/28 | (2006.01) | |
| F02C 9/26 | (2006.01) | |
| G01N 9/26 | (2006.01) | |
| G01N 9/32 | (2006.01) | |
| B64D 37/28 | (2006.01) | |

(52) U.S. Cl.
CPC ............... *F02C 9/28* (2013.01); *F02C 9/26* (2013.01); *G01N 9/26* (2013.01); *G01N 9/32* (2013.01); *B64D 37/28* (2013.01); *F05D 2220/323* (2013.01); *F05D 2260/60* (2013.01); *F05D 2270/07* (2013.01)

(58) Field of Classification Search
CPC .......... F02C 9/28; F02C 9/26; F05D 2260/60; F05D 2220/323; G01N 9/26; G01N 9/32
See application file for complete search history.

(56) References Cited

U.S. PATENT DOCUMENTS

| | | |
|---|---|---|
| 4,108,574 A | 8/1978 | Bartley et al. |
| 4,429,528 A | 2/1984 | Matthews et al. |
| 4,508,127 A | 4/1985 | Thurston |
| 5,138,559 A | 8/1992 | Kuehl et al. |
| 8,549,863 B2 | 10/2013 | Brocard et al. |

(Continued)

FOREIGN PATENT DOCUMENTS

WO     9724596 A1     7/1997

OTHER PUBLICATIONS

Extended European Search Report dated Mar. 23, 2021, received for corresponding European Application No. 20206467.1, 11 pages.

(Continued)

*Primary Examiner* — Andrew H Nguyen
(74) *Attorney, Agent, or Firm* — Kinney & Lange, P.A.

(57) ABSTRACT

Apparatus and associated methods relate to simultaneously pumping and measuring density of an aircraft fuel. The aircraft fuel is pumped by a centrifugal pump having an impeller. A rotational frequency of the impeller is determined while the centrifugal pump is pumping the aircraft fuel. Flow rate of the aircraft fuel through the centrifugal pump is sensed. Pressure of the aircraft fuel is measured at two different points within or across the centrifugal pump or a differential pressure is measured between the two different points while the centrifugal pump is pumping the aircraft fuel. Density of the aircraft fuel is determined based on a head-curve relation characterizing the centrifugal pump. The head-curve relation relates the fuel density to the rotational frequency, the flow rate, and pressures at the two different points or the differential pressure between the two different points.

20 Claims, 5 Drawing Sheets

(56) References Cited

U.S. PATENT DOCUMENTS

| | | | |
|---|---|---|---|
| 9,091,217 B2 | 7/2015 | Hodinot et al. | |
| 2006/0254765 A1* | 11/2006 | Pfeiffer | E21B 43/16 |
| | | | 166/252.3 |
| 2012/0042657 A1 | 2/2012 | Hodinot et al. | |
| 2012/0166110 A1 | 6/2012 | Wilson | |
| 2016/0141687 A1* | 5/2016 | Yamamoto | H01M 8/04097 |
| | | | 429/414 |
| 2016/0245188 A1* | 8/2016 | Selstad | F02C 9/263 |
| 2016/0348568 A1* | 12/2016 | Kanefsky | F01P 5/12 |
| 2017/0167391 A1* | 6/2017 | Demelas | F02C 9/30 |

OTHER PUBLICATIONS

The British Library, Gas Turbine Fuel Systems and Fuels, 86 pages.
EP Examination Report dated Jun. 24, 2022, received for corresponding European Application No. 20206467.1, pp. 5.

\* cited by examiner

SIMULTANEOUSLY PUMPING AND MEASURING DENSITY OF AIRCRAFT FUEL

CROSS-REFERENCE TO RELATED APPLICATION(S)

This application is related to U.S. Non-Provisional application Ser. No. 16/659,150 filed Oct. 21, 2019, for "Measuring Density of Aircraft Fuel Using a Centrifugal Fluid Pump," by Gerald P. Dyer and Charles E. Reuter, the entire disclosure of which is hereby incorporated by reference.

BACKGROUND

Fuel metering of an aircraft involves measurement of fuel density, which can change in response to changes in conditions. Temperature, for example, affects the density of fuels used in aircraft engines. The amount of energy contained in a particular volume of fuel is dependent on the density of the fuel. Thus, aircraft fuel systems measure density of the fuel so that accurate metering of fuel to the engines can be performed. Temperature variations, pressure variations and vibrations that are experienced on an aircraft in flight can make accurate measurements of fuel density difficult.

SUMMARY

Some embodiments relate to a system for simultaneously pumping and measuring density of an aircraft fuel. The system includes a centrifugal pump including an impeller configured to pump the aircraft fuel. The system includes a speed sensing arrangement configured to determine a rotational frequency of the impeller while the centrifugal pump is pumping the aircraft fuel. The system includes a flow-rate sensing arrangement configured to measure flow rate of the aircraft fuel through the centrifugal pump. The system includes a pressure sensing arrangement configured to measure pressure at two different points within or across the centrifugal pump or a differential pressure between the two different points while the centrifugal pump is pumping the aircraft fuel. The system includes computer-readable memory containing data indicative of a head-curve relation corresponding to the centrifugal pump. The system also includes a processor configured to calculate a density of the aircraft fuel based on the head-curve relation, the rotational frequency, the flow rate, and either the pressures of the two different points or the differential pressure between the two different points.

Some embodiments relate to a method for simultaneously pumping and measuring density of aircraft fuel. The method includes pumping the aircraft fuel with a centrifugal pump. The method includes measuring flow rate of the aircraft fuel pumped by the centrifugal pump. The method includes measuring, while the centrifugal pump is pumping the aircraft fuel, pressure at two different points within the centrifugal pump or a differential pressure between the two different points. The method includes measuring a rotational frequency of an impeller of the centrifugal pump. The method includes retrieving, from computer-readable memory, data indicative of a head-curve relation characterizing the centrifugal pump. The method also includes calculating, via a processor, a density of the aircraft fuel based on the head-curve relation, the rotational frequency, the flow rate, and either the pressures of the two different points or the differential pressure between the two different points.

DETAILED DESCRIPTION

Apparatus and associated methods relate to simultaneously pumping and measuring density of an aircraft fuel. The aircraft fuel is pumped by a centrifugal pump having an impeller. A rotational frequency of the impeller is determined while the centrifugal pump is pumping the aircraft fuel. Flow rate of the aircraft fuel through the centrifugal pump is sensed. Pressure of the aircraft fuel is measured at two different points within or across the centrifugal pump or a differential pressure is measured between the two different points while the centrifugal pump is pumping the aircraft fuel. Density of the aircraft fuel is determined based on a head-curve relation characterizing the centrifugal pump. The head-curve relation relates the fuel density to the rotational frequency, the flow rate, and pressures at the two different points or the differential pressure between the two different points.

Figure 1:
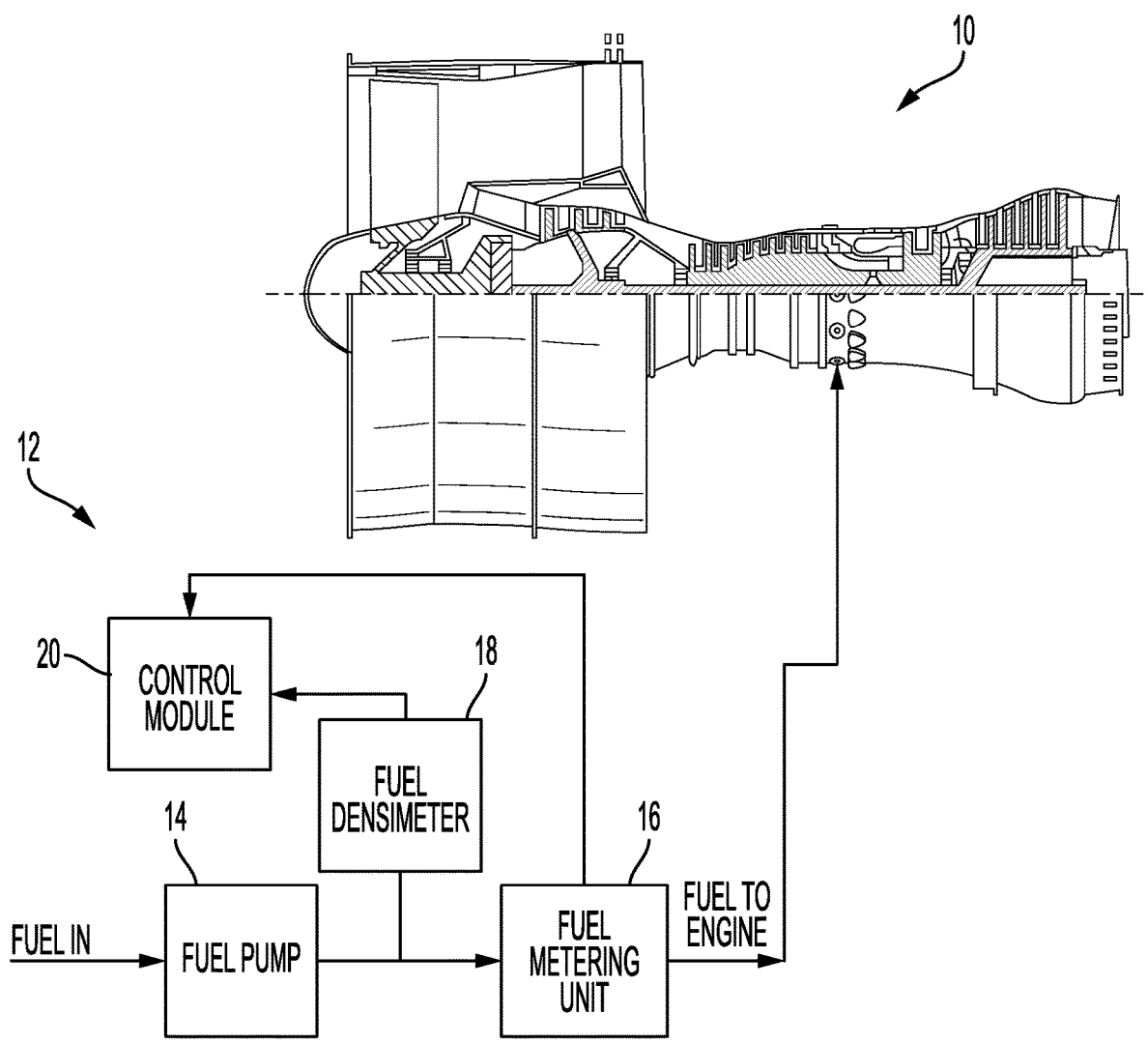
FIG. 1 is a schematic view of an aircraft engine supplied with fuel by a fuel system that simultaneously pumps and measures density of aircraft fuel using a single impeller.

FIG. 1 is a schematic view of an aircraft engine configured to be supplied with aircraft fuel by a fuel system. In FIG. 1, aircraft engine 10 includes fuel system 12. Fuel system 12 includes fuel pump 14, fuel metering unit 16, Fuel densimeter 18, and fuel control module 20.

Fuel pump 14 receives fuel from a fuel inlet port connected to a fuel line and pumps the received fuel to an outlet port. Fuel densimeter 18 receives the fuel from the outlet port of fuel pump 14, measures the density of the fuel, and provides fuel control module 20 a signal indicative of the measured density of the fuel. Fuel control module 20 controls the fuel metering unit 16, based at least in part on the measured density of the fuel. Fuel metering unit 16 then meters the fuel provided to aircraft engine 10 as controlled by fuel control module 20. Fuel densimeter includes a centrifugal pump and pressure sensors configured to measure fluid pressure at various radial distances from an impeller axis.

Figure 2:
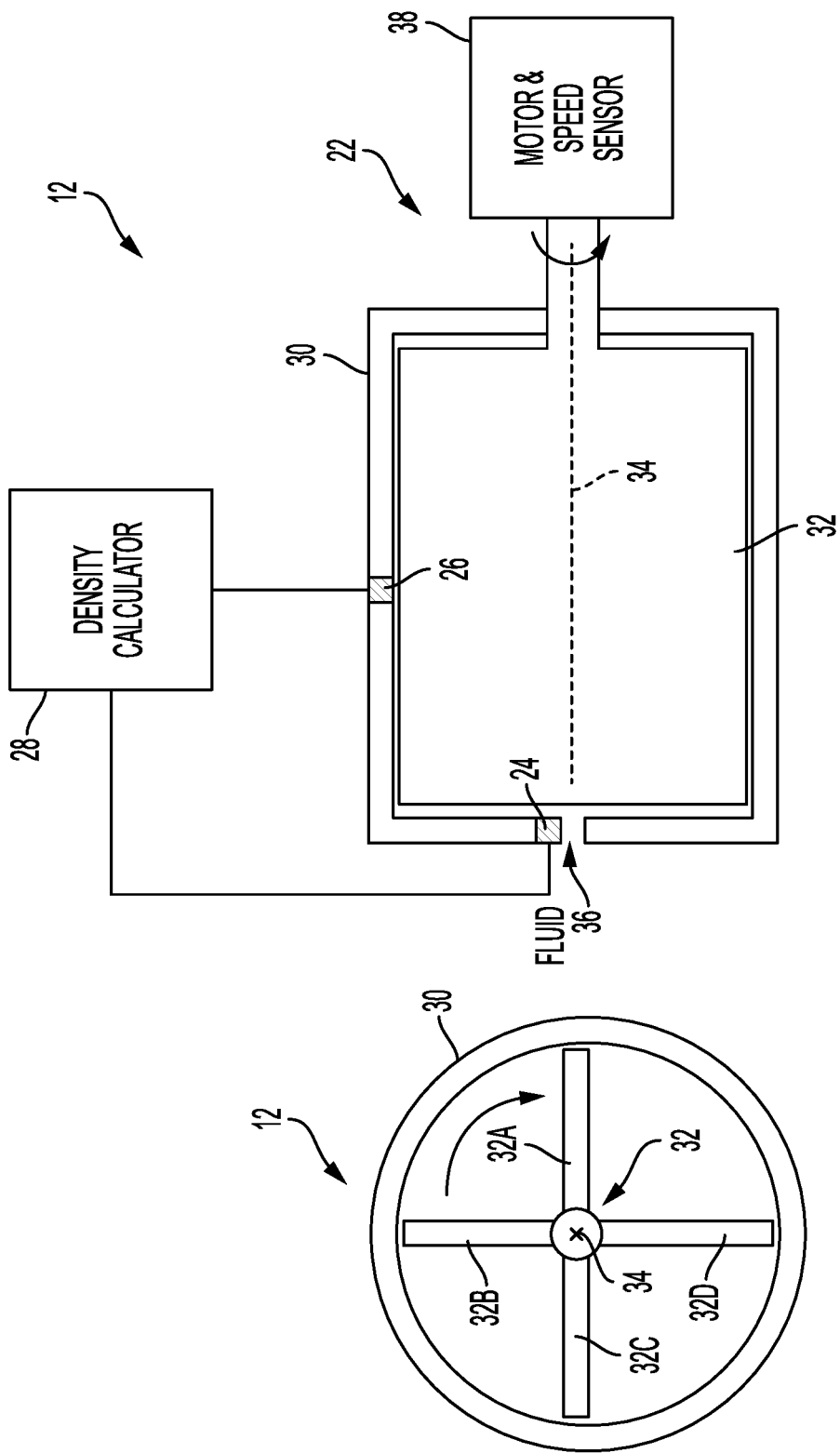
FIG. 2 shows cross-sectional views of a fuel system that simultaneously pumps and measures density of aircraft fuel using a single impeller.

FIG. 2 shows cross-sectional views of a densimeter that measures density of aircraft fuel. In FIG. 2, densimeter 12 includes centrifugal pump 22, first and second pressure sensors 24 and 26, and fuel density calculator 28. Centrifugal pump 22 has pump casing 30 in which resides impeller 32. Pump casing 30 has fuel inlet 36 through which the aircraft fuel is drawn. In some embodiments, pump casing 30 has a fuel outlet through which the aircraft fuel is pumped. The fuel outlet can be used to facilitate circulation of fuel through pump casing 30. Impeller 32 is configured to rotate about impeller axis 34. Impeller 32 has a plurality of blades 32A-32D. Impeller 32, when rotated, causes the aircraft fuel to be circularly rotated within pump casing 30, thereby creating a pressure differential between fuel located near impeller axis 34 and fuel located at a radial periphery of pump casing 30. Impeller 32, when rotated, causes a pressure difference between a first fuel pressure at a first radial distance from the impeller axis 34 and a second fuel pressure at a second radial distance from the impeller axis 34.

First pressure sensor 24 is configured to measure the first fuel pressure, and second pressure sensor 26 is configured to measure the second fuel pressure. Second pressure sensor 24 is further configured to measure second fuel pressure in a radial direction at the pump casing. Density calculator 28 configured to calculate density of the aircraft fuel based on the first and second fuel pressures as measured by first and second pressure sensors 24 and 26.

Densimeter is also depicted in FIG. 2 as having motor and speed sensor 38. In some embodiments, motor and speed sensor 38 can be electrically coupled to densimeter calculator 28, so that densimeter calculator 28 can control the rotational speed of impeller 32.

Centrifugal pump 22 has pump casing 30 in which resides impeller 32. Pump casing 30 has fuel inlet 36 through which the aircraft fuel is drawn and, in some embodiments, a fuel outlet through which the aircraft fuel is pumped. In the depicted embodiment, fuel inlet 36 is aligned near or along impeller axis 34. The fuel outlet, if present, is at a radially distal location of pump casing 30 as measured from impeller axis 34. Impeller 32 is configured to rotate about impeller axis 34. Impeller 32 has a plurality of blades 32A-32D. Impeller 32, when rotated, causes the aircraft fuel to be drawn from fuel inlet 36 and to be expelled through the fuel outlet, if so equipped. Impeller 32, when rotated, also causes a pressure difference between first fuel pressure $P_1$ at a first radial distance $r_1$ from the impeller axis 34 and second fuel pressure $P_2$ at a second radial distance $r_2$ from the impeller axis 34.

As the impeller is rotated, a centrifugal pump imparts a rotational or circumferential component R to flow of the aircraft fuel being pumped. Because of this rotational component, a radial pressure gradient of the pumped fuel is produced. This radial pressure gradient varies for aircraft fuels of different densities. Therefore, such a pressure gradient can be indicative of the density of the aircraft fuel. For systems in which the first fuel pressure is measured along impeller axis 34 (i.e, the radial distance of first pressure sensor 24 from impeller axis 34 is zero: $r_1$=0), such a relation between density D and measured pressures can be given by:

$$D = \frac{2(P_2 - P_1)}{r_2^2 \omega^2}. \quad (1)$$

Here, $P_1$ is the first fuel pressure, $P_2$ is the second fuel pressure, $r_2$ is the radial distance of second pressure sensor 26 from impeller axis 34, and ω is the rotation frequency of aircraft fuel. The rotational frequency of the aircraft fuel can measured and/or calculated based on a rotational frequency of the impeller as measured by motor and speed sensor 38. In some embodiments, a relation between the rotational frequency of the impeller and the rotational frequency of the aircraft fuel can be based on aircraft fuel dynamics. In some embodiments, the aircraft fuel dynamics of the system are such that the rotational frequency of the impeller and the rotational frequency of the aircraft fuel are substantially equal to one another.

Various embodiments have first and second pressure sensors 24 and 26 located at various radial distances $r_1$ and $r_2$ from impeller axis 34. For example a ratio of the distance $r_1$ to distance $r_2$ can be less than 0.25, 0, 1, 0.05, or it can be 0.00 when first pressure sensor 24 is aligned along impeller axis 34.

In the embodiment in FIG. 2, centrifugal pump 22 is a zero flow pump, having no fuel outlet. For such a zero flow pump, the impeller can be designed to direct the fluid in purely circumferential directions about impeller axis 34. Such circumferential directed impellers can also be used for pumps designed for small flow rates—flow rates that corresponding to operation near zero flow rate as described above. The impeller of such a zero flow pump can have substantial axial mirror symmetry, thereby having to axial direction that is preferential.

In the embodiment depicted in FIG. 2, impeller 32 is an open vane impeller. An open vane impeller has blades, such as blades 32A-32D extending from a central hub. In some embodiments, impeller 32 can be a semi-open vane impeller. A semi-open vane impeller has a plate, which in some embodiments can be substantially circular, affixed to one axial side of impeller blades 32A-32D. In some embodiments, impeller 32 can be a closed vane impeller, which has plates on both axial sides of impeller blades 32A-32D.

First pressure sensor 24 is configured to measure the first fuel pressure, and second pressure sensor 26 is configured to measure the second fuel pressure. Second pressure sensor 26 is further configured to measure second fuel pressure in a radial direction at the pump casing. Such a radial directive sensor can have a sensing membrane that has a normal vector aligned with a radial direction from the impeller axis. For example, the radial directive sensor can have a sensing membrane that is substantially conformal with an inside surface of pump casing 22. Such a sensing membrane can deflect, in response to aircraft fuel pressure, in the radial direction that is parallel to the normal vector of the membrane. Fuel control module 20 can be configured to calculate density of the aircraft fuel based on the first and second fuel pressures as measured by first and second pressure sensors 24 and 26.

In some embodiments, instead of first and second pressure sensors 24 and 26, a differential pressure sensor measure a differential pressure between two different radial locations $r_1$ and $r_2$ from impeller axis 34. For example, instead of pressures sensors 24 and 26 at the radial locations $r_1$ and $r_2$ from impeller axis 34, a differential pressure sensor can be in fluid communication with ports located where pressures sensors 24 and 26 are depicted in FIG. 2.

Figure 3:
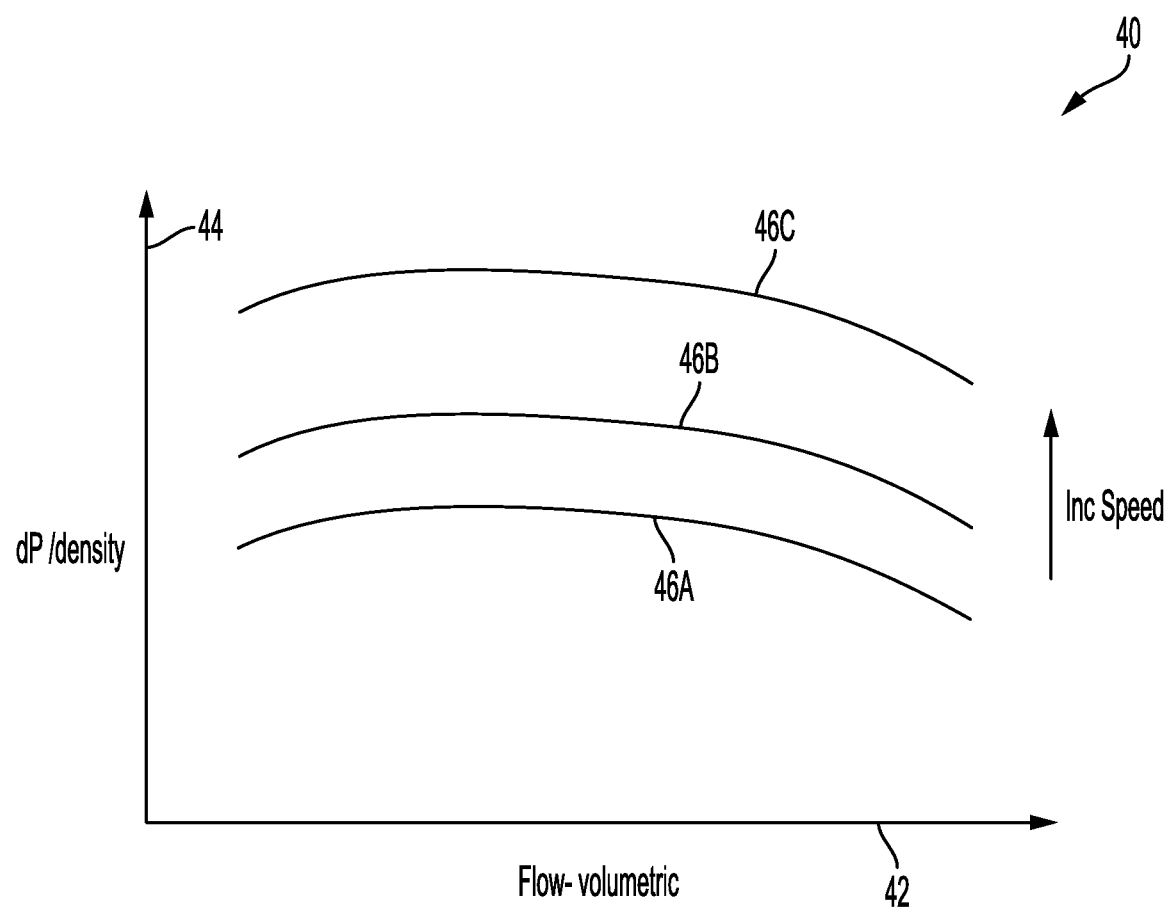
FIG. 3 is a graph depicting a relation between measured differential pressure and fluid flow and/or pump speed.

FIG. 3 is a graph depicting a relation between normalized differential pressure and fluid flow and/or pump speed. In FIG. 3, graph 40 includes horizontal axis 42, vertical axis 44 and relations 46A, 46B, and 46C. Horizontal axis 42 is indicative of volumetric flow of a fluid being pumped by a centrifugal pump, such as centrifugal pump 22 depicted in FIG. 2. Vertical axis 44 is indicative of normalized differential pressure of the fluid being pumped by the centrifugal pump (for a given fluid density). Normalized differential pressure is a ratio of the sensed differential pressure to the fluid density. Relations 46A-46C are indicative of relationships between the normalized differential pressure and the volumetric flow of the pumped fluid for different rotational speeds of the pump impeller, such as impeller 32 depicted in FIG. 2.

As depicted in FIG. 3, for a given rotational speed, the measured pressure differential is not constant, even for a fluid with constant density. For embodiments in which no fluid flow is caused by rotation of impeller 32 (e.g., embodiments having no outlet port), such variable relations are not problematic. In such no-flow embodiments, the only operable point in the relation between measured density and volumetric flow is at the vertical axis where volumetric flow is zero. For embodiments that provide fluid flow via an outlet port, however, rate of fluid flow must be either measured (or otherwise be known), or must be controlled to within a certain range about a target operating point. For example, the flow rate can be maintained near zero by providing a small flowrate, as controlled, for example, by a pinhole orifice in the fuel outlet path. Such a low flow rate can facilitate fuel circulation, while maintaining fluid flow near the target operating point (e.g., near zero). Such a rate of fluid flow can be, for example, a flow rate corresponding to a measured differential pressure being within 0.1%, 0.5%, 1%, or 2% of the differential pressure measured for a zero fluid flow rate, for example.

In some embodiments, such as those which will be disclosed below with reference to FIG. 5, a measured flow rate is used in the determination of density of the aircraft fuel. For example, using a known relation between differential pressure and fluid flow and/or pump speed, accurate determination of aircraft fuel density can be determined based on impeller speed, measured flow rate, and measured differential pressure. Various ways of determining such accurate determinations of aircraft fuel density can be performed using such measured metrics, as will be described below.

Figure 4:
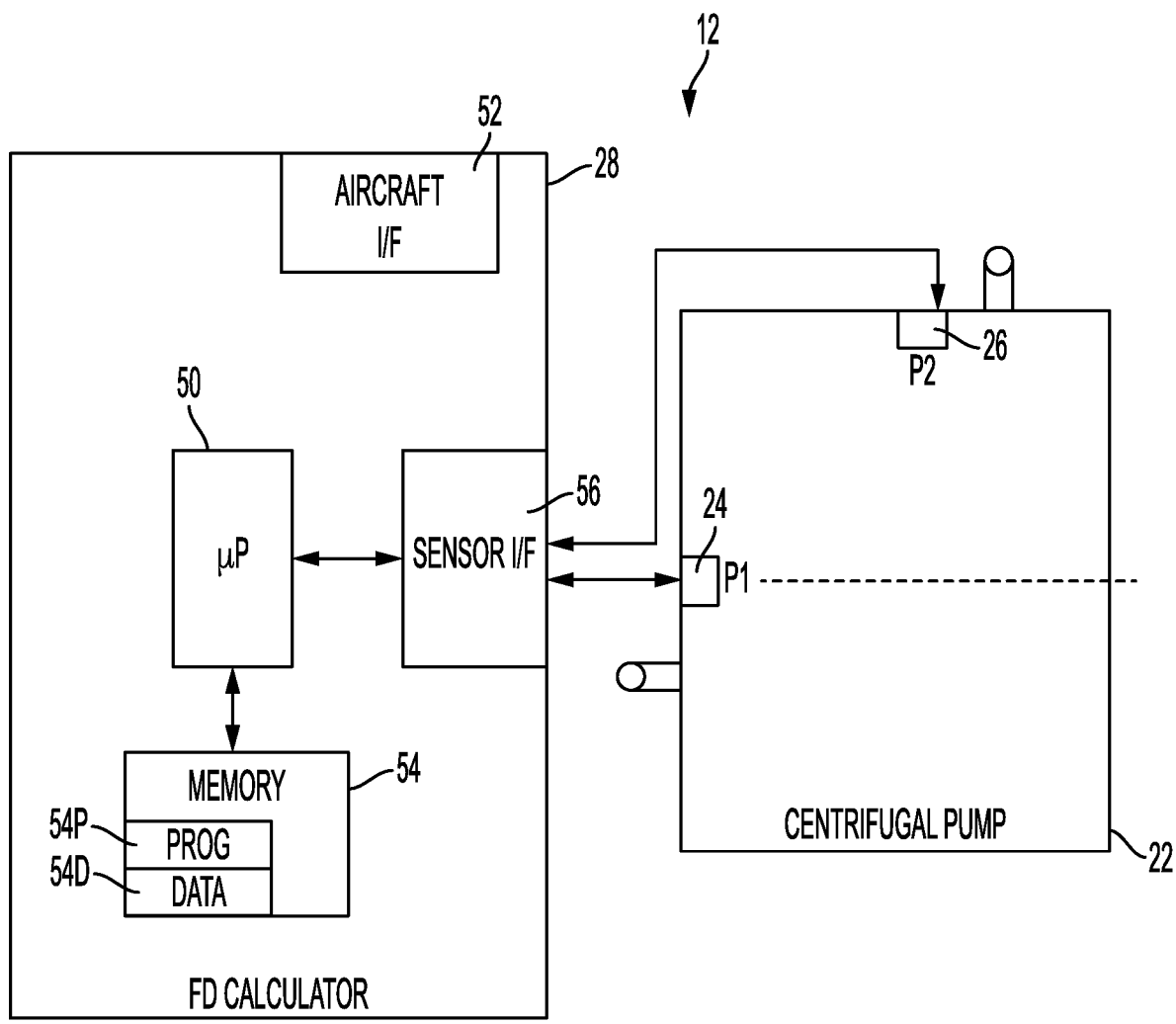
FIG. 4 is a block diagram of fuel system that simultaneously pumps and measures density of aircraft fuel using a single impeller.

FIG. 4 is a block diagram of fuel system that simultaneously pumps and measures density of aircraft fuel using a single impeller. In FIG. 4, fuel system 12 includes centrifugal pump 22, first and second pressure sensors 24 and 26, and fuel density calculator 28. Fuel density calculator includes processor(s) 50, aircraft interface 52, and storage device(s) 54, and sensor interface 56. Processor(s) 50 can receive program instructions 54P from storage device(s) 54. Processor(s) 50 can be configured to calculate fuel density, based on received pressure sensor signals and on program instructions 54P. For example, processor(s) 50 can be configured to receive pressure sensor signals, via sensor interface 56, indicative of measured fuel pressures $P_1$ and $P_2$. Processor(s) 50 can calculate fuel density based on the received pressure sensor signals and provide the calculated density to other aircraft systems via aircraft interface 52.

As illustrated in FIG. 4, fuel density calculator 28 includes processor(s) 50, aircraft interface 52, storage device(s) 54, and sensor interface 56. However, in certain examples, fuel density calculator 28 and/or fuel system 12 can include more or fewer components. For instance, in some embodiments, fuel system 12 can include a tachometer configured to measure a rotational velocity of the impeller and/or a rotational flow measurement sensor. The rotational velocity of the impeller as measured by a tachometer, can be indicative of the rotational frequency of the aircraft fuel. In some embodiments, fuel density calculator can include a flow regulator configured to regulate, based at least in part on the calculated fuel density, fuel flow of the aircraft fuel. In some examples, fuel density calculator 28 can be performed in one of various aircraft computational systems, such as, for example, an existing Full Authority Digital Engine Controller (FADEC) of the aircraft.

Processor(s) 50, in one example, is configured to implement functionality and/or process instructions for execution within fuel density calculator 28. For instance, processor(s) 50 can be capable of processing instructions stored in storage device(s) 54. Examples of processor(s) 50 can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) 50 can be configured to perform fuel density calculations.

Storage device(s) 54 can be configured to store information within fuel density calculator 28 during operation. Storage device(s) 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 54 is a temporary memory, meaning that a primary purpose of storage device(s) 54 is not long-term storage. Storage device(s) 54, in some examples, is described as volatile memory, meaning that storage device(s) 54 do not maintain stored contents when power to Fuel density calculator 28 is turned off. Examples of volatile memories can include random access memories (RAM), dynamic random access memories (DRAM), static random access memories (SRAM), and other forms of volatile memories. In some examples, storage device(s) 54 is used to store program instructions for execution by processor(s) 50. Storage device(s) 54, in one example, is used by software or applications running on fuel density calculator 28 (e.g., a software program implementing fuel density calculation).

Storage device(s) 54, in some examples, can also include one or more computer-readable storage media. Storage device(s) 54 can be configured to store larger amounts of information than volatile memory. Storage device(s) 54 can further be configured for long-term storage of information. In some examples, storage device(s) 54 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 52 can be used to communicate information between fuel density calculator 28 and an aircraft. In some embodiments, such information can include aircraft conditions, flying conditions, and/or atmospheric conditions. In some embodiments, such information can include data processed by fuel density calculator 28, such as, for example, alert signals. Aircraft interface 52 can also include a communications module. Aircraft interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Figure 5:
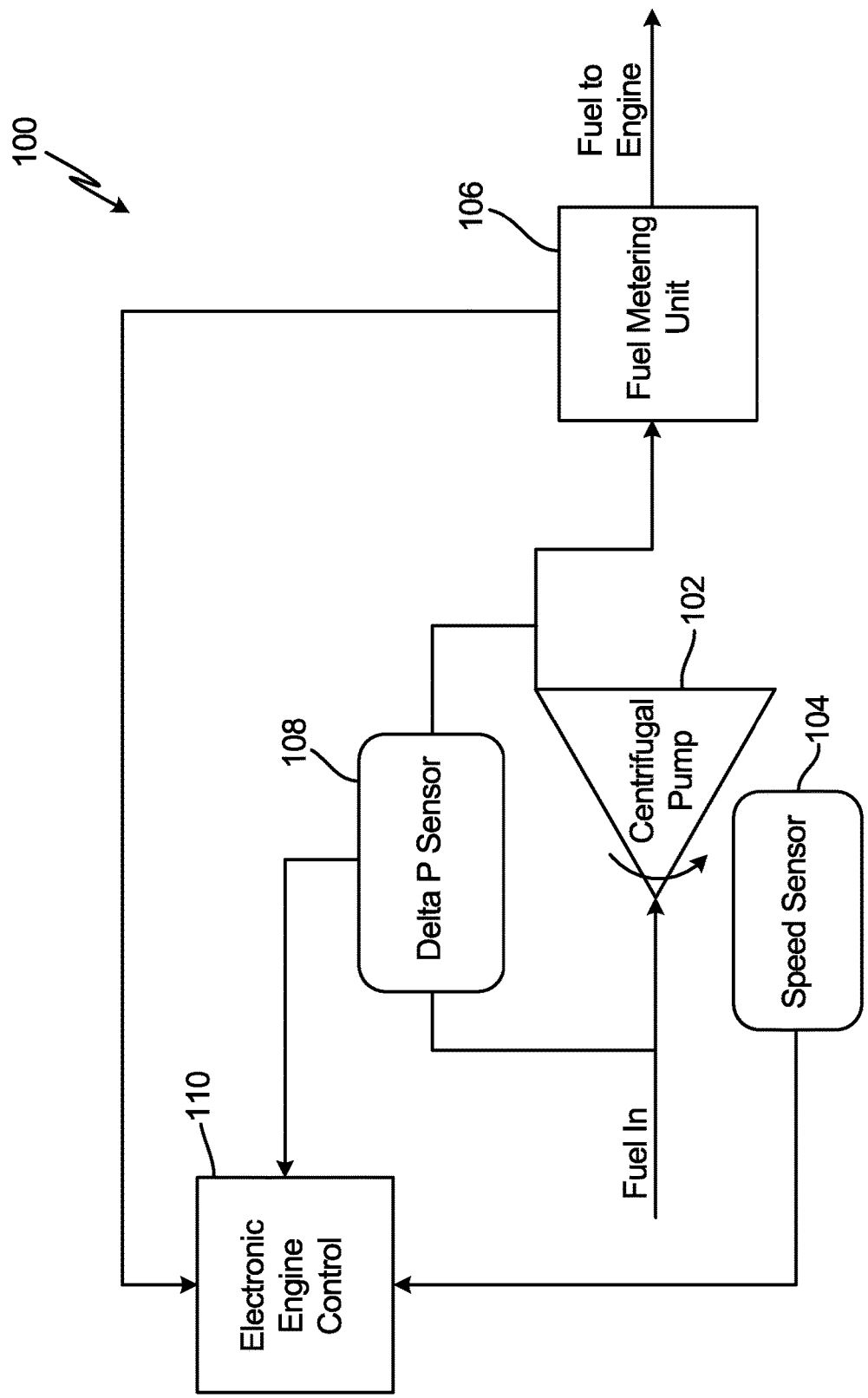
FIG. 5 is a schematic diagram of a fuel system that simultaneously pumps fuel and measures fuel density based on a manufacturer's head curve.

FIG. 5 is a schematic diagram of a fuel system that simultaneously pumps fuel and measures fuel density based on a manufacturer's head curve. In FIG. 5, fuel system 100 includes centrifugal pump 102, speed sensing arrangement 104, flow-rate sensing arrangement 106, pressure sensing arrangement 108, and processor 110. Centrifugal pump 102 includes an impeller (not depicted) configured to pump the aircraft fuel. Speed sensing arrangement 104 is configured to determine a rotational frequency of the impeller while the centrifugal pump is pumping the aircraft fuel. Flow-rate sensing arrangement 104 is configured to measure flow rate of the aircraft fuel through centrifugal pump 102. Pressure sensing arrangement 108 is configured to measure pressure at two different points within or across centrifugal pump 102 or a differential pressure between the two different points while centrifugal pump 102 is pumping the aircraft fuel. Processor 110 is configured to calculate a density of the aircraft fuel based on the manufacturer's head curve. The manufacturer's head curve relates a normalized differential pressure to the rotational frequency and the flow rate. The normalized differential pressure is the differential pressure divided by the fluid density. Using this head curve along with the differential pressure, the rotational frequency, and the flow rate, the fluid density can be determined.

Fuel system 100 depicted in FIG. 5 can determine a fluid density using a head curve pertaining to the specific centrifugal pump 102, using the measured parameters of differential pressure, impeller rotational frequency, and fluid flow rate. For example, measurements of impeller speed, fluid flow rate, and differential pressure can be provided as inputs, and a density of the fluid can be calculated using the head curve pertaining to centrifugal pump 102. These measured inputs can be used to calculate a theoretical fluid density using the head curve relation that relates such measured inputs to fluid density, such as, for example, a manufacturer-provided head curve relation. In some embodiments, temperature of the fluid being pumped by centrifugal pump 102 can be measured and used in addition to the above cited measurement inputs for determining the fluid density.

Discussion of Possible Embodiments

The following are non-exclusive descriptions of possible embodiments of the present invention.

Some embodiments relate to a system for simultaneously pumping and measuring density of an aircraft fuel. The system includes a centrifugal pump including an impeller configured to pump the aircraft fuel. The system includes a speed sensing arrangement configured to determine a rotational frequency of the impeller while the centrifugal pump is pumping the aircraft fuel. The system includes a flow-rate sensing arrangement configured to measure flow rate of the aircraft fuel through the centrifugal pump. The system includes a pressure sensing arrangement configured to measure pressure at two different points within or across the centrifugal pump or a differential pressure between the two different points while the centrifugal pump is pumping the aircraft fuel. The system includes computer-readable memory containing data indicative of a head-curve relation corresponding to the centrifugal pump. The system also includes a processor configured to calculate a density of the aircraft fuel based on the head-curve relation, the rotational frequency, the flow rate, and either the pressures of the two different points or the differential pressure between the two different points The system of the preceding paragraph can optionally include, additionally and/or alternatively, any one or more of the following features, configurations and/or additional components:

A further embodiment of the foregoing system, wherein the flow-rate sensing arrangement can include a fuel metering unit configured to meter, based at least in part on the calculated fuel density, the aircraft fuel to an aircraft engine, wherein the fuel metering unit includes the flow-rate sensing arrangement.

A further embodiment of any of the foregoing systems, wherein the fuel metering unit can include a flow regulator configured to regulate, based at least in part on the calculated fuel density, fuel flow of the aircraft fuel.

A further embodiment of any of the foregoing systems, wherein the pressure sensing arrangement can measure the differential pressure between inlet and outlet ports of the centrifugal pump.

A further embodiment of any of the foregoing systems can further include a temperature sensor configured to measure the temperature of the aircraft fuel pumped by the centrifugal pump. The processor is configured to calculate a density of the aircraft fuel further based on the measured temperature of the aircraft fuel pumped by the centrifugal pump.

A further embodiment of any of the foregoing systems, wherein the impeller can be an open vane impeller.

A further embodiment of any of the foregoing systems, wherein the impeller can be a semi-open vane impeller.

A further embodiment of any of the foregoing systems, wherein the impeller can be a closed vane impeller.

A further embodiment of any of the foregoing systems, wherein the rotational frequency of the impeller can be indicative of a rotational frequency of the aircraft fuel about the impeller axis.

A further embodiment of any of the foregoing systems, wherein the speed sensing arrangement can include a tachometer configured to measure a rotational frequency of the impeller, the rotational frequency being indicative of the rotational frequency of the aircraft fuel.

A further embodiment of any of the foregoing systems, wherein centrifugal pump can be an axial flow pump.

A further embodiment of any of the foregoing systems, wherein centrifugal pump can be a radial flow pump.

Some embodiments relate to a method for simultaneously pumping and measuring density of aircraft fuel. The method includes pumping the aircraft fuel with a centrifugal pump. The method includes measuring flow rate of the aircraft fuel pumped by the centrifugal pump. The method includes measuring, while the centrifugal pump is pumping the aircraft fuel, pressure at two different points within the centrifugal pump or a differential pressure between the two different points. The method includes measuring a rotational frequency of an impeller of the centrifugal pump. The method includes retrieving, from computer-readable memory, data indicative of a head-curve relation characterizing the centrifugal pump. The method also includes calculating, via a processor, a density of the aircraft fuel based on the head-curve relation, the rotational frequency, the flow rate, and either the pressures of the two different points or the differential pressure between the two different points.

The method of the preceding paragraph can optionally include, additionally and/or alternatively, any one or more of the following features, configurations and/or additional components:

A further embodiment of the foregoing method can further include metering based at least in part on the calculated fuel density, the aircraft fuel to an aircraft engine.

A further embodiment of any of the foregoing methods can further include regulating, based at least in part on the calculated fuel density, fuel flow of the aircraft fuel.

A further embodiment of any of the foregoing methods, wherein measuring pressure at two different points can further include measuring the differential pressure between inlet and outlet ports of the centrifugal pump.

A further embodiment of any of the foregoing methods can further include measuring temperature of the aircraft fuel in the centrifugal pump. Calculating a density of the aircraft fuel can be further based on the measured temperature of the aircraft fuel in the centrifugal pump.

A further embodiment of any of the foregoing methods, wherein the impeller can be an open vane impeller.

A further embodiment of any of the foregoing methods, wherein the impeller can be a semi-open vane impeller.

A further embodiment of any of the foregoing methods, wherein the impeller can be a closed vane impeller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for simultaneously pumping and measuring a fuel density of an aircraft fuel, the system comprising:
    a centrifugal pump including an impeller configured to pump the aircraft fuel;
    a speed sensing arrangement configured to determine a rotational frequency of the impeller while the centrifugal pump is pumping the aircraft fuel;
    a flow-rate sensing arrangement configured to measure flow rate of the aircraft fuel through the centrifugal pump;
    a pressure sensing arrangement configured to measure pressure at two different points within or across the centrifugal pump or a differential pressure between the two different points while the centrifugal pump is pumping the aircraft fuel;
    computer-readable memory containing data indicative of a normalized head-curve relation corresponding to the centrifugal pump, the normalized head-curve relation relating a normalized differential pressure to the rotational frequency and the flow rate, the normalized differential pressure being the differential pressure divided by a fluid density; and
    a processor configured to calculate the fuel density of the aircraft fuel based on the normalized head-curve relation, the rotational frequency, the flow rate, and either the pressures of the two different points or the differential pressure between the two different points.

2. The system of claim 1, wherein the flow-rate sensing arrangement comprises:
    a fuel metering unit configured to meter, based at least in part on the calculated fuel density, the aircraft fuel to an aircraft engine, wherein the fuel metering unit includes the flow-rate sensing arrangement.

3. The system of claim 2, wherein the fuel metering unit comprises:
    a flow regulator configured to regulate, based at least in part on the calculated fuel density, fuel flow of the aircraft fuel.

4. The system of claim 1, wherein the pressure sensing arrangement measures the differential pressure between inlet and outlet ports of the centrifugal pump.

5. The system of claim 1, further comprising:
    a temperature sensor configured to measure the temperature of the aircraft fuel pumped by the centrifugal pump,
    wherein the processor is configured to calculate the fuel density of the aircraft fuel further based on the measured temperature of the aircraft fuel pumped by the centrifugal pump.

6. The system of claim 1, wherein the impeller is an open vane impeller.

7. The system of claim 1, wherein the impeller is a semi-open vane impeller.

8. The system of claim 1, wherein the impeller is a closed vane impeller.

9. The system of claim 1, wherein the rotational frequency of the impeller is indicative of a rotational frequency of the aircraft fuel about the impeller axis.

10. The system of claim 1, wherein the speed sensing arrangement comprises: a tachometer configured to measure the rotational frequency of the impeller, the rotational frequency being indicative of a rotational frequency of the aircraft fuel.

11. The system of claim 1, wherein the centrifugal pump is an axial flow pump.

12. The system of claim 1, wherein the centrifugal pump is a radial flow pump.

13. A method for simultaneously pumping and measuring a fuel density of aircraft fuel, the method comprising:
    pumping the aircraft fuel with a centrifugal pump;
    measuring flow rate of the aircraft fuel pumped by the centrifugal pump;
    measuring, while the centrifugal pump is pumping the aircraft fuel, pressure at two different points within the centrifugal pump or a differential pressure between the two different points;
    measuring a rotational frequency of an impeller of the centrifugal pump;
    retrieving, from computer-readable memory, data indicative of a normalized head-curve relation characterizing the centrifugal pump, the normalized head-curve relation relating a normalized differential pressure to the rotational frequency and the flow rate, the normalized differential pressure being the differential pressure divided by a fluid density; and
    calculating, via a processor, the fuel density of the aircraft fuel based on the normalized head-curve relation, the rotational frequency, the flow rate, and either the pressures of the two different points or the differential pressure between the two different points.

14. The method of claim 13, further comprising:
    metering based at least in part on the calculated fuel density, the aircraft fuel to an aircraft engine.

15. The method of claim 13, further comprising:
    regulating, based at least in part on the calculated fuel density, fuel flow of the aircraft fuel.

16. The method of claim 13, wherein measuring pressure at two different points includes:
    measuring the differential pressure between inlet and outlet ports of the centrifugal pump.

17. The method of claim 13, further comprising:
    measuring temperature of the aircraft fuel in the centrifugal pump, wherein calculating the fuel density of the aircraft fuel is further based on the measured temperature of the aircraft fuel in the centrifugal pump.

18. The method of claim 13, wherein the impeller is an open vane impeller.

19. The method of claim 13, wherein the impeller is a semi-open vane impeller.

20. The method of claim 13, wherein the impeller is a closed vane impeller.

* * * * *